US012014532B2

(12) United States Patent
Herman et al.

(10) Patent No.: US 12,014,532 B2
(45) Date of Patent: Jun. 18, 2024

(54) SYSTEMS AND METHODS FOR DETECTING DISTRACTED DRIVING BY A DRIVER OF A VEHICLE (71) Applicant: Ford Global Technologies, LLC, Dearborn, MI (US)

(72) Inventors: David Michael Herman, Oak Park, MI (US); Yashanshu Jain, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 867 days.

(21) Appl. No.: 17/111,356

(22) Filed: Dec. 3, 2020

(65) Prior Publication Data

US 2022/0180722 A1 Jun. 9, 2022

(51) Int. Cl.
*G06V 10/60* (2022.01)
*G06V 10/20* (2022.01)
(Continued)

(52) U.S. Cl.
CPC ............ *G06V 10/60* (2022.01); *G06V 10/255* (2022.01); *G06V 10/62* (2022.01); *G08B 21/02* (2013.01); *G08G 1/0962* (2013.01)

(58) Field of Classification Search
CPC ...... G06V 10/60; G06V 10/62; G06V 10/255; G08B 21/02; G08G 1/0962;
(Continued)

(56) References Cited

U.S. PATENT DOCUMENTS 7,639,148 B2 * 12/2009 Victor ................. B60W 50/087
340/576
9,308,914 B1 * 4/2016 Sun .................... B60W 60/0051
(Continued)

FOREIGN PATENT DOCUMENTS

CN WO2018098947 A1 * 6/2018 ............. B60Q 9/008

OTHER PUBLICATIONS

Chuang et al., "Estimating Gaze Direction of Vehicle Drivers Using a Smartphone Camera" IEEE Conference on Computer Vision and Pattern Recognition Workshops, Jun. 2014, pp. 165-170.
(Continued)

*Primary Examiner* — Hung Q Nguyen
*Assistant Examiner* — Anthony Donald Taylor, Jr.
(74) *Attorney, Agent, or Firm* — Frank Lollo; Eversheds Sutherland (US) LLP (57) ABSTRACT

This disclosure is generally directed to systems and methods for detecting distracted driving. In an example method, a light source identification procedure may be executed for detecting a first device present inside a vehicle and outside a field of view of a driver monitoring camera (such as upon a dashboard). The procedure can include evaluating an image data sample obtained from the driver monitoring camera so as to identify various devices that may be emitting light incident upon the face of the driver. The incident light may include a first pulse pattern corresponding to light emitted by the first device and a second pulse pattern corresponding to light emitted by a second device. The first device can be detected in various ways such as by evaluating a phase relationship between the first pulse pattern and the second pulse pattern and/or by evaluating spectral content present in the image data sample.

18 Claims, 6 Drawing Sheets

(51) Int. Cl.
*G06V 10/62* (2022.01)
*G08B 21/02* (2006.01)
*G08G 1/0962* (2006.01)

(58) Field of Classification Search
CPC ....... B60W 2420/40; B60W 2420/403; B60W 2420/42; B60W 20/12; B60W 40/00; B60W 40/08; B60W 2040/0818; B60W 40/09; B60W 2554/4047; B60W 2554/4048; B60W 2554/4049
USPC .......................................................... 701/45
See application file for complete search history.

(56) References Cited

U.S. PATENT DOCUMENTS

| | | | | |
|---|---|---|---|---|
| 9,881,221 | B2* | 1/2018 | Bala | G06V 40/171 |
| 10,836,309 | B1* | 11/2020 | Trundle | G08G 1/0116 |
| 11,654,921 | B2* | 5/2023 | Conners | B60W 40/06 |
| | | | | 348/148 |
| 2006/0011399 | A1* | 1/2006 | Brockway | A61B 5/18 |
| | | | | 180/272 |
| 2010/0130182 | A1* | 5/2010 | Rosen | H04M 3/42357 |
| | | | | 455/414.1 |
| 2016/0021238 | A1 | 1/2016 | Abramson et al. | |
| 2017/0105098 | A1* | 4/2017 | Cordova | H04W 4/38 |
| 2017/0337438 | A1* | 11/2017 | el Kaliouby, Jr. | A61B 5/6893 |
| 2019/0133510 | A1* | 5/2019 | el Kaliouby | G08G 1/096725 |
| 2019/0197330 | A1* | 6/2019 | Mahmoud | B60W 40/08 |
| 2019/0279009 | A1* | 9/2019 | Srirangam Narashiman et al. | |
| | | | | G06T 7/248 |
| 2020/0143560 | A1* | 5/2020 | Lu | G06T 7/73 |
| 2020/0320320 | A1* | 10/2020 | Lynam | G06V 40/166 |
| 2021/0229672 | A1* | 7/2021 | Herman | G06T 3/4015 |
| 2021/0357670 | A1* | 11/2021 | Wu | G06V 20/56 |

OTHER PUBLICATIONS

Anshul Saxena, "Experience Safe and Smart Driving With Vision-Based Advanced Driver Assistance Systems (ADAS)", Jul. 24, 2018, 11 pgs.

* cited by examiner

SYSTEMS AND METHODS FOR DETECTING DISTRACTED DRIVING BY A DRIVER OF A VEHICLE

FIELD OF THE DISCLOSURE

This disclosure generally relates to driver behavior and more particularly relates to distracted driving.

BACKGROUND

A major concern in traffic safety is driver behavior, particularly distracted driving and drowsiness. Vehicle manufacturers have addressed such types of driver behaviors by offering driver monitoring systems (DSMs). A typical driver monitoring system monitors various physical characteristics of a driver in order to continuously assess his/her alertness. One of the various physical characteristics that may be monitored includes the driver's eyes, which could identify various conditions including for example drowsiness. Typically, the eyelids of a sleepy driver tend to be droopy, partially closed, or fully closed. When such condition is detected, the driver monitoring system may provide an audible alarm and/or provide vibration in the steering wheel of the vehicle to alert and awaken the driver.

However, in some cases, a driver may be fully awake but may take his/her eyes off the road due to distraction inside or outside the vehicle. A driver monitoring system may monitor a direction of gaze of the driver and determine that the driver is not looking at the road but is instead looking towards an object located inside the vehicle such as, for example, a child in the back seat of the vehicle. The driver monitoring system may issue an audible warning to prompt the driver to stop being distracted and pay attention to the road. Such an arrangement works fairly well when the direction of the gaze of the driver is distinctly directed away from the road ahead. However, a devious driver may decide to fool the driver monitoring system by placing a device (such as a smartphone or a laptop) on the dashboard of the vehicle in a way that the driver's eyes appear to be looking at the road ahead even though the driver is actually looking at the device.

It is, therefore, desirable to address at least this shortcoming in conventional practice.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for detecting distracted driving by a driver of a vehicle. In an example method in accordance with the disclosure, a light source identification procedure may be executed in order to detect a first device such as a smartphone, for example, that is present inside a cabin of a vehicle and outside a field of view of a driver monitoring camera. The light source identification procedure can include operations such as obtaining an image data sample from the driver monitoring camera and evaluating the image data sample to identify various devices emitting light incident upon the face of the driver. In an example scenario, the incident light may have, for example, a first pulse pattern corresponding to light emitted by the first device and a second pulse pattern corresponding to light emitted by a second device. The first pulse pattern corresponds to light emitted by a display screen of the first device placed upon a dashboard of the vehicle (where the first device is outside a field of view of a driver monitoring camera). The second pulse pattern corresponds to light emitted by a display screen of a second device. Additional pulse patterns may exist that correspond to various other light sources located inside the cabin of the vehicle as well as outside the vehicle. In one example solution, the first device can be detected by executing a time windowing operation for evaluating a phase relationship between the first pulse pattern and the second pulse pattern. In another example solution, the first device can be detected by evaluating spectral content that may be present in the image data sample.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience, and such words, terms, and labels should be interpreted as referring to various objects and actions that are generally understood in various forms and equivalencies by persons of ordinary skill in the art. For example, the label "vehicle" as used in this disclosure encompasses any of various types of vehicles such as, for example, a car, a sports utility vehicle (SUV), a truck, a van, a semi-trailer truck, a bus, and an autonomous vehicle of any kind. The phrase "autonomous vehicle" as used in this disclosure generally refers to a vehicle that can perform at least a few operations without human intervention. At least some of the described embodiments are applicable to Level 1 vehicles, and may be applicable to higher level vehicles as well. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation. The phrase "software application" as used herein refers to various types of code (firmware, software, machine code, etc.) that may be installed in a device and executed to implement one or more operations in accordance with the disclosure. The word "image" as used herein can refer to a single digital image or to multiple digital images (a video clip, for example). The word "information" as used herein represents data that may be conveyed in various forms such as, for example, images, text, numbers, digital data, and raw analog data. The phrase "image data sample" as used herein is intended to encompass all forms of image-related information such as, for example, images in an analog format, images in a digital format (JPEG, TIFF, GIF, BMP, etc.), and/or video in various formats (MPEG, MP4, MOV, WMV, FLV, AVI, WebM, etc.). The phrase "evaluating an image data sample" encompasses various types of operations that may be performed upon images and/or upon image data (such as, for example, image processing, filtering, enhancing, discriminating, etc.). The word "example" as used herein is intended to be non-exclusionary and non-limiting in nature.

Figure 1:
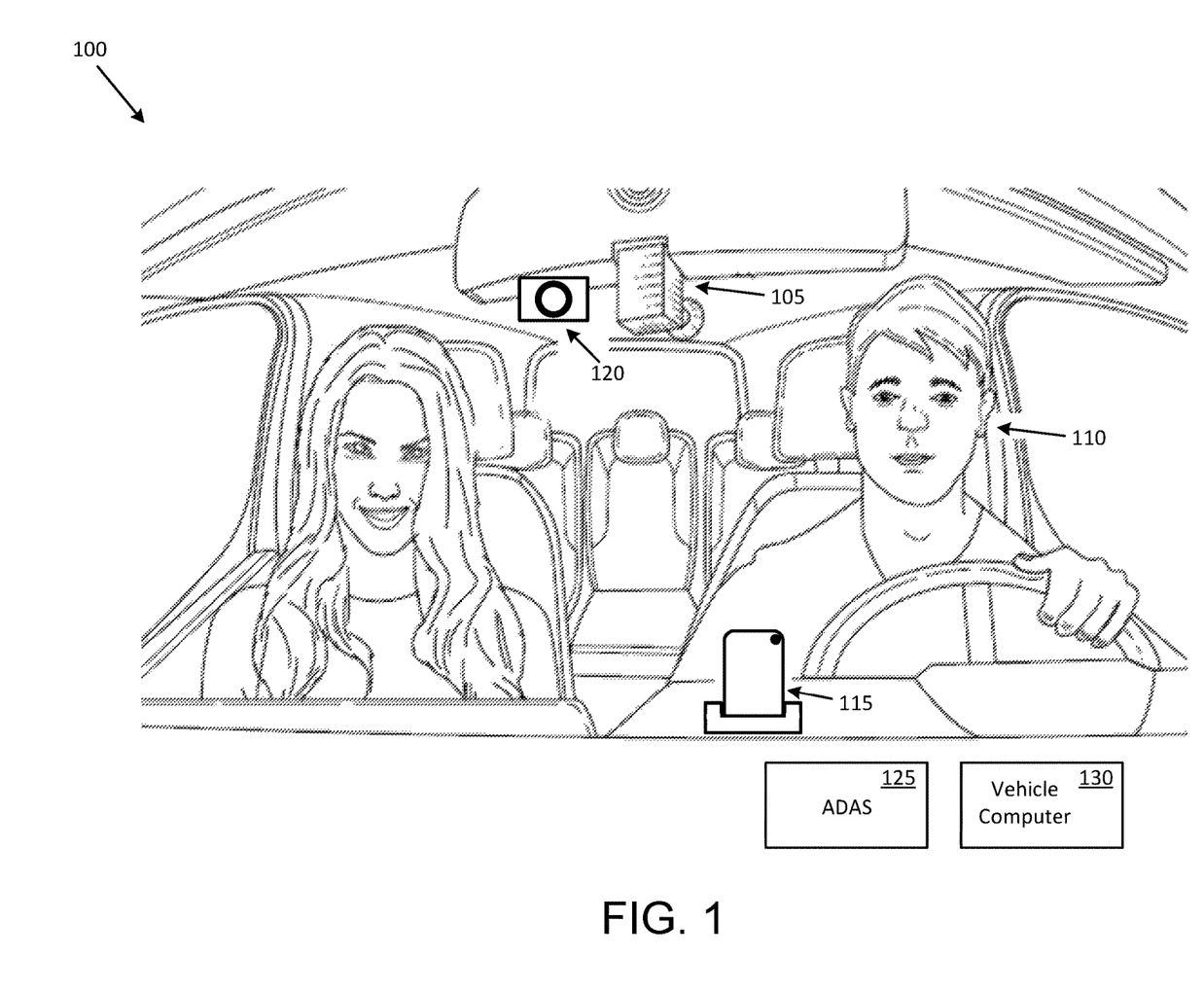
FIG. 1 illustrates an example distracted driving scenario.

FIG. 1 illustrates an example distracted driving scenario in which a driver 110 of a vehicle 100 is looking at a device 115 placed upon the dashboard of the vehicle 100 instead of watching the road ahead. The device 115 can be any of various types of devices that emit light such as, for example, a personal communication device (a smartphone, for example), an entertainment device (a DVD player, for example), and/or a navigation device (a global positioning system (GPS), for example). In an embodiment in accordance with the disclosure, the light emitted by the device 115 is originated by components of a display screen such as, for example, light-emitting diodes (LEDs) in the display screen. Images may be displayed on the display screen of the device 115 by an example technique wherein the LEDs are toggled on and off so as to produce bright and dark areas in black and white images and/or in color images.

The vehicle 100 may further include a driver assistance system that may be referred to as an advanced driver assistance system (ADAS) 125. The ADAS 125 may provide various types of features that may not only assist the driver 110 in performing certain operations upon the vehicle 100 but also automates, adapts, and enhances various vehicle systems to make driving safer. The ADAS 125 may, for example, automate lighting operations, provide adaptive cruise control, assist in avoiding collisions, issue traffic warnings, alert the driver 110 to possible obstacles, assist in lane departure and lane centering, and/or provide navigational assistance. The ADAS 125 also typically implements safety features that reduce road fatalities by minimizing or eliminating certain types of human errors that may lead to accidents and/or collisions. In some cases, the ADAS 125 may alert the driver 110 to problems and execute safety maneuvers by taking control of the vehicle 100, if necessary. In an example scenario, the driver 110 may not be paying attention to the road ahead because the driver 110 is looking at a display screen of the device 115. The ADAS 125 may detect this incidence of distracted driving and execute a safety-related operation such as, for example, issuing a driver alert and/or taking over control of some operations that would ordinarily be performed by the driver 110. In another example scenario, the ADAS 125 may take control of operations such as acceleration, braking, and steering of the vehicle 100 under certain circumstances. The driver 110 maintains situational awareness and is capable of taking back control of the vehicle 100 at any moment, with minimal delay.

The ADAS 125 may carry out these operations based on data received from various types of devices such as, for example, a driver monitoring camera 105, an external object monitoring camera 120, and a vehicle computer 130. The driver monitoring camera 105 may be mounted upon any of various fixtures of the vehicle 100 such as, for example, on the dashboard of the vehicle 100, the steering wheel of the vehicle 100, or the rear-view mirror of the vehicle 100 (as illustrated in FIG. 1). The driver monitoring camera 105 is arranged to have a field-of-view that encompasses the face of the driver 110. Images captured by the driver monitoring camera 105 may be evaluated by the ADAS 125 to detect various conditions such as, for example, drowsiness, inebriation, and/or distraction.

A drowsiness condition may be detected by evaluating an eyelid status of the driver 110. Droopy, half-closed, or fully-closed eyelids may provide an indication to the ADAS 125 that the driver 110 is drowsy and/or inebriated. The ADAS 125 may issue a driver alert upon detecting the drowsiness and/or inebriated condition. The driver alert can, for example, be issued in the form of an audio message via an infotainment system of the vehicle 100 and/or as a haptic vibration transmitted via the steering wheel of the vehicle 100.

A distracted driving condition may be detected by evaluating a direction-of-gaze status of the driver 110. In one example scenario, the driver 110 may have taken his/her eyes off the road ahead and turned around to look over his/her shoulder at a passenger seated in a back seat of the vehicle 100. In another example scenario, the driver 110 may have taken his/her eyes off the road ahead and may be performing activities such as looking at a mirror in a sunshade visor in order to apply lipstick, apply eye-makeup, or to shave. The ADAS 125 may issue a driver alert upon detecting this distracted driving condition. The driver alert can, for example, be issued in the form of an audio message via an infotainment system of the vehicle 100.

In yet another scenario, the driver 110 may have taken his/her eyes off the road ahead to watch the video being played on the device 115. The device 115 is located outside a field of view of the driver monitoring camera 105 and images conveyed by the driver monitoring camera 105 to the ADAS 125 appear to indicate that the driver 110 is paying attention to the road ahead. The distracted driving condition of the driver 110 in this example scenario, may be detected by the ADAS 125 executing various operations that are described herein in accordance with the disclosure.

The external object monitoring camera 120 is arranged to capture images of various objects that may not be present in the field of view of the driver monitoring camera 105. More particularly, the external object monitoring camera 120 is arranged to capture images of various objects that are located outside the vehicle 100 such as, for example, vehicles moving ahead of the vehicle 100, traffic signals, pedestrians, obstacles present on the road, road signs, and/or buildings. The images may be evaluated by the ADAS 125 and/or other devices such as the vehicle computer 130, for various purposes such as, for example, for accident avoidance and insurance purposes after an accident. The external object monitoring camera 120 may be mounted upon any of various fixtures of the vehicle 100, such as, for example, on the dashboard of the vehicle 100 or the windshield of the vehicle 100.

The vehicle computer 130 may perform various functions upon the vehicle 100 such as, for example, controlling engine operations (fuel injection, speed control, emissions control, braking, etc.), managing climate controls (air conditioning, heating, etc.), activating airbags, and issuing warnings (check engine light, bulb failure, low tire pressure, vehicle in blind spot, etc.). In applications where the vehicle 100 is autonomous, the vehicle computer 130 may control various autonomous actions performed by the autonomous vehicle. The vehicle computer 130 may also cooperate with the ADAS 125 to perform various driving assistance functions include addressing distracted driving conditions in accordance with the disclosure.

The vehicle computer 130 and/or the ADAS 125 may wirelessly communicate via a communication network with devices such as, for example, a cloud-based computer (not shown) and/or a cloud-based storage device. The communications network may include any one network, or a combination of networks, such as, for example, a local area network (LAN), a wide area network (WAN), a telephone network, a cellular network, a cable network, a wireless network, and/or private/public networks such as the Internet. The communications network may support one or more types of communication technologies such as, for example, Bluetooth®, Ultra-Wideband, cellular, near-field communication (NFC), Wi-Fi, Wi-Fi direct, Li-Fi, controller area network (CAN), local interconnect network (LIN), machine-to-machine communication, and/or man-to-machine communication. At least one portion of the communications network includes a wireless communication link that allows the vehicle computer 130 and/or the ADAS 125 to communicate with the cloud-based server computer, for example. In some implementations, the cloud-based computer may execute various operations that are described herein in accordance with the disclosure. The operations may be executed independently and/or in cooperation with the ADAS 125.

Figure 2:
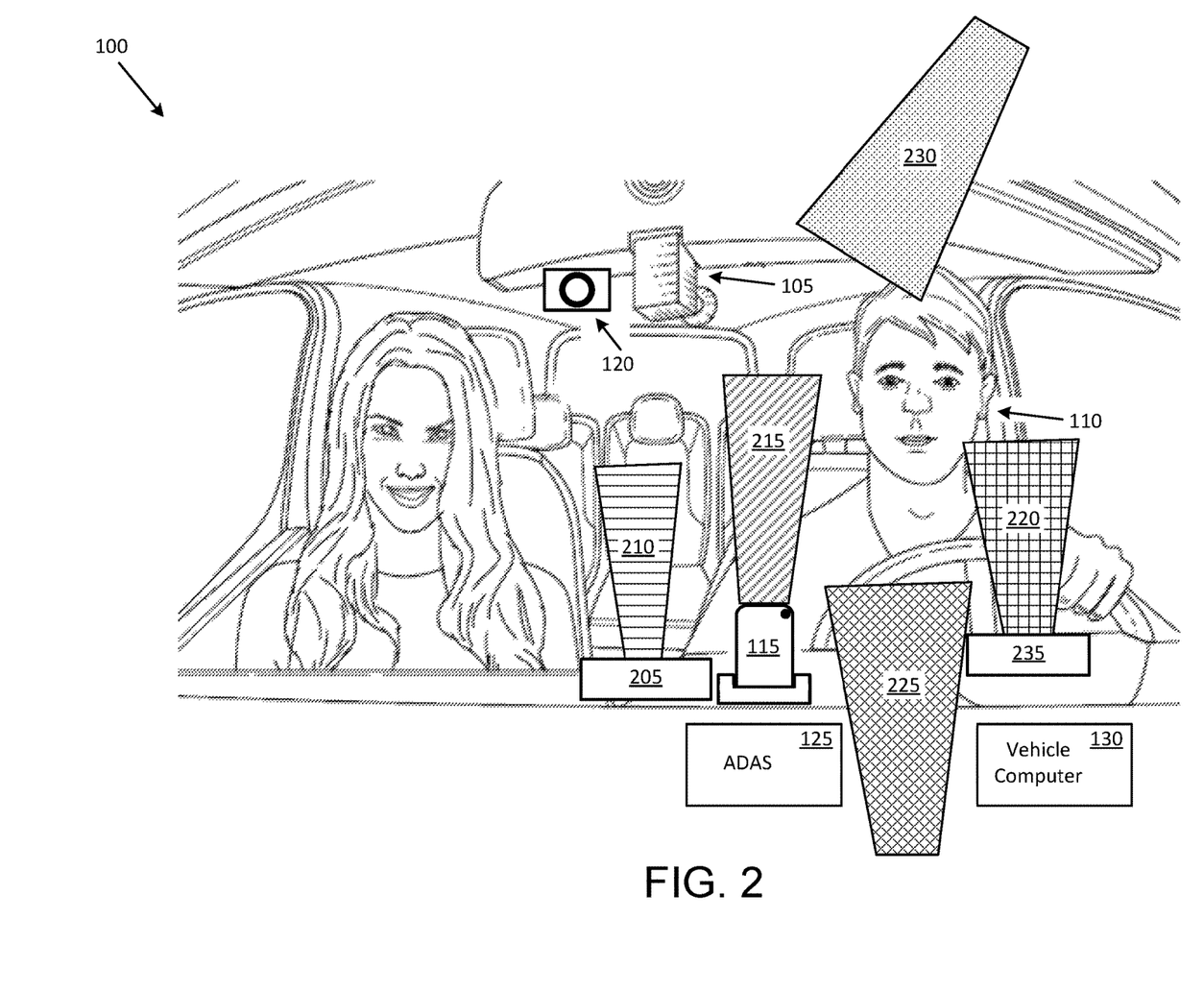
FIG. 2 illustrates some example sources of light that may be present inside a vehicle and may be used to detect distracted driving in accordance with an embodiment of the disclosure.

FIG. 2 illustrates some example sources of light that may be present inside the vehicle 100 and used for detecting distracted driving in accordance with an embodiment of the disclosure. The various example sources of light can include the device 115 that may emit light 215 from a display screen of the device 115, an infotainment system 205 that may emit light 210 from a display screen of the infotainment system 205, and an instrument panel 235 that may emit light 220 from a display screen of the instrument panel 235. Each of the device 115, the infotainment system 205, and the instrument panel 235 may utilize pulse modulation techniques for displaying images upon their respective display screens, particularly if the display screens include light-emitting components such as light-emitting devices (LEDs). Such light-emitting devices are typically turned on and off rapidly by the use of one or more pulsed signals, for example, so as to produce bright and dark areas of image frames. The characteristics of the pulsed signals such as, for example, a pulse repetition rate and a duty cycle may sometimes cause flickering in images displayed upon the display screen of the device. The flickering may or may not be perceivable by humans.

Light present inside the vehicle 100 may further include ambient light 230 and external light 225. Ambient light 230 may be originated from natural and/or man-made sources (sunlight, streetlights, etc.). Ambient light originated by natural sources such as the sun does not typically have a flickering characteristic (as may be present in an image displayed on a display screen of a device). External light 225 may be originated from objects present in front of the vehicle 100 (tail lights, headlights, traffic lights, lights on buildings, lights on fixtures, etc.). Flickering in external light 225 may be dependent on the source of the external light 225. A tail light of another vehicle in front of the vehicle 100 may include an incandescent bulb in one case and a LED array in another case. Flickering may be non-existent in the tail light housing the incandescent bulb but may be present in the tail light housing the LED array.

In an embodiment in accordance with the disclosure, the driver monitoring camera 105 is arranged to have a field of view that encompasses the face of the driver 110 so as to provide information to the ADAS 125 for evaluating a state of the driver 110 (drowsiness state, inebriated state, distraction state, etc.). The information may be provided in various forms such as, for example, in the form of one or more images and/or a video feed. Such information may be generally referred to herein as image data samples.

In an example implementation, the driver monitoring camera 105 is a rolling shutter camera. A rolling shutter camera typically captures an image or a video frame by rapidly scanning a scene (either horizontally or vertically) rather than taking a snapshot at a single instant. Consequently, not all parts of the image are captured simultaneously. This procedure may produce image distortions, particularly of fast-moving objects. In this case, the driver monitoring camera 105 captures images of the driver 110 (and all other objects inside the field of view of the driver monitoring camera 105) by executing a scanning process that may involve applying a pulsed signal to an image sensor. The characteristics of the pulsed signal can be tailored to provide various exposure times to the image sensor. In an example application, the rolling shutter camera includes a complementary-metal-oxide-semiconductor (CMOS) sensor that captures light signals corresponding to objects located in the field of view of the rolling shutter camera. The light signals captured by the CMOS sensor under control of a pulsed signal may be referred to as picture elements (pixels). The pixels are converted to electrical signals (representing a digital image) by circuitry coupled to the CMOS sensor. The optical-to-electrical signal conversion may be carried out by employing a pulse modulation technique involving the use of a pulsed signal. In some cases, the use of the pulse modulation technique can lead to aberrations in image data samples. Each image data sample can include digital information corresponding to a single image or multiple images. Image aberrations may be corrected by applying image processing techniques (image filtering, reconstruction, error correction, etc.).

In another example implementation, the driver monitoring camera 105 is a global shutter camera that captures images of the driver 110 (and all other objects inside the field of view of the driver monitoring camera 105) by executing image capture of an entire frame at any single moment in time. Each image frame constitutes an image data sample containing digital information corresponding to a single image or multiple images. A charge-coupled-device (CCD) sensor, which may be included in the global shutter camera, is coupled to circuitry that performs the optical-to-electrical conversion for producing electrical signals that represent a digital image. In some cases, image aberrations can occur as a result of the use of certain frame rates for image capture.

Images captured by the driver monitoring camera 105 not only contain information of light incident upon the face of the driver 110 but also light that is present inside the vehicle 100 in the cabin area. In this embodiment, light present inside the vehicle 100 includes light 215 from the display screen of the device 115, light 210 from the display screen of the infotainment system 205, light 220 from the display screen of the instrument panel 235, and ambient light 230.

Information about external light 225 originated by objects external to, and in front of, the vehicle 100 (tail lights of other vehicles, headlights of other vehicles, traffic lights, lights on buildings, lights on fixtures, etc.) may be contained in images captured by the external object monitoring camera 120.

Image data samples from the driver monitoring camera 105 and the external object monitoring camera 120 can be conveyed to the ADAS 125 for evaluation to detect a distracted driving state of the driver 110 in accordance with an embodiment of the disclosure.

Figure 3:
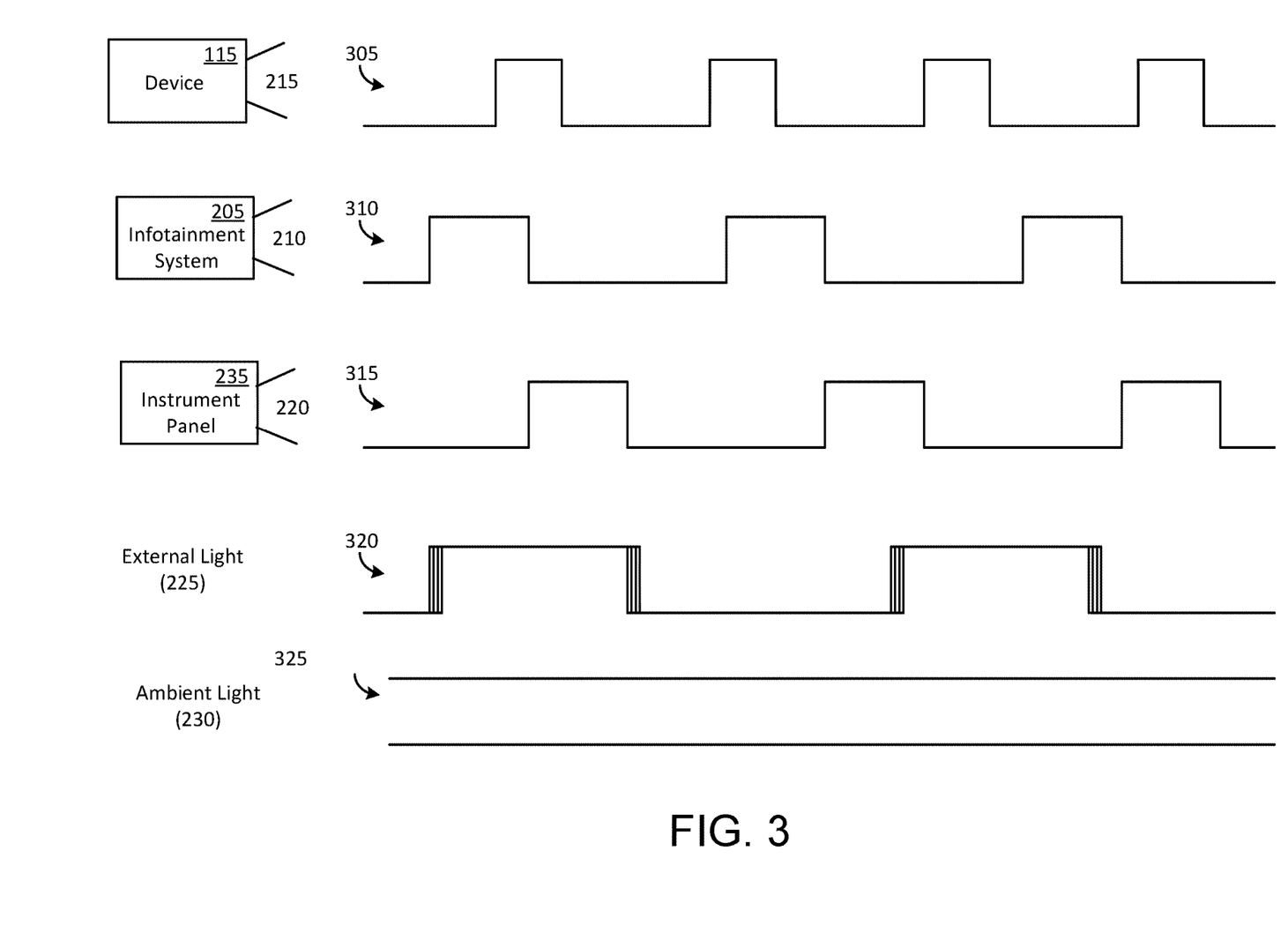
FIG. 3 illustrates some example pulse patterns associated with various types of light that may be present inside a vehicle.

FIG. 3 illustrates some example of pulse patterns associated with some example types of light that may be present inside the vehicle 100. Light 215 emitted by a display screen of the device 115 may have a flicker characteristic represented by a pulse pattern 305. Light 210 emitted by a display screen of the infotainment system 205 may have a flicker characteristic represented by a pulse pattern 310. Light 220 emitted by a display screen of the instrument panel 235 may have a flicker characteristic represented by a pulse pattern 315. External light 225 originated by an object present in front of the vehicle 100 may have a flicker characteristic that may be represented by a pulse pattern 320. Ambient light 230 (sunlight, for example) entering the cabin area of the vehicle 100 may have a relatively constant amplitude that may be illustrated by an ambient light condition 325.

In this example scenario, the device 115 employs a pulse modulation technique that produces the flicker characteristic represented by the pulse pattern 305. The pulse pattern 305 has a first duty cycle and a first pulse repetition rate. The infotainment system 205 contains circuitry that is independent of the circuitry contained in the device 115 and employs a pulse modulation technique that produces the flicker characteristic represented by the pulse pattern 310. The pulse pattern 310 has a second duty cycle and a second pulse repetition rate that is different than the first duty cycle and the first pulse repetition rate of the pulse pattern 305. Furthermore, a first phase offset may exist between the pulse pattern 310 and the pulse pattern 305.

The instrument panel 235 contains circuitry that is independent of the circuitry contained in the device 115 but may share some commonalities with circuitry contained in the infotainment system 205. The commonalities may include the use of one or more signals provided, for example, by the vehicle computer 130 (clock signal, modulation signal, etc.). The instrument panel 235 employs a pulse modulation technique that produces the flicker characteristic represented by the pulse pattern 315. The shared commonalities may result in the pulse pattern 315 having a third duty cycle and a third pulse repetition rate that is substantially similar to the second duty cycle and the second pulse repetition rate of the pulse pattern 310. However, a phase offset may exist between the pulse pattern 315 and the pulse pattern 310 (as well as the pulse pattern 305).

The pulse pattern 320 associated with external light 225 that originates from outside the vehicle 100 and captured by external object monitoring camera 120 may have a duty cycle and pulse repetition rate that is different than those of the pulse pattern 305, pulse pattern 310, and pulse pattern 315.

Figure 4:
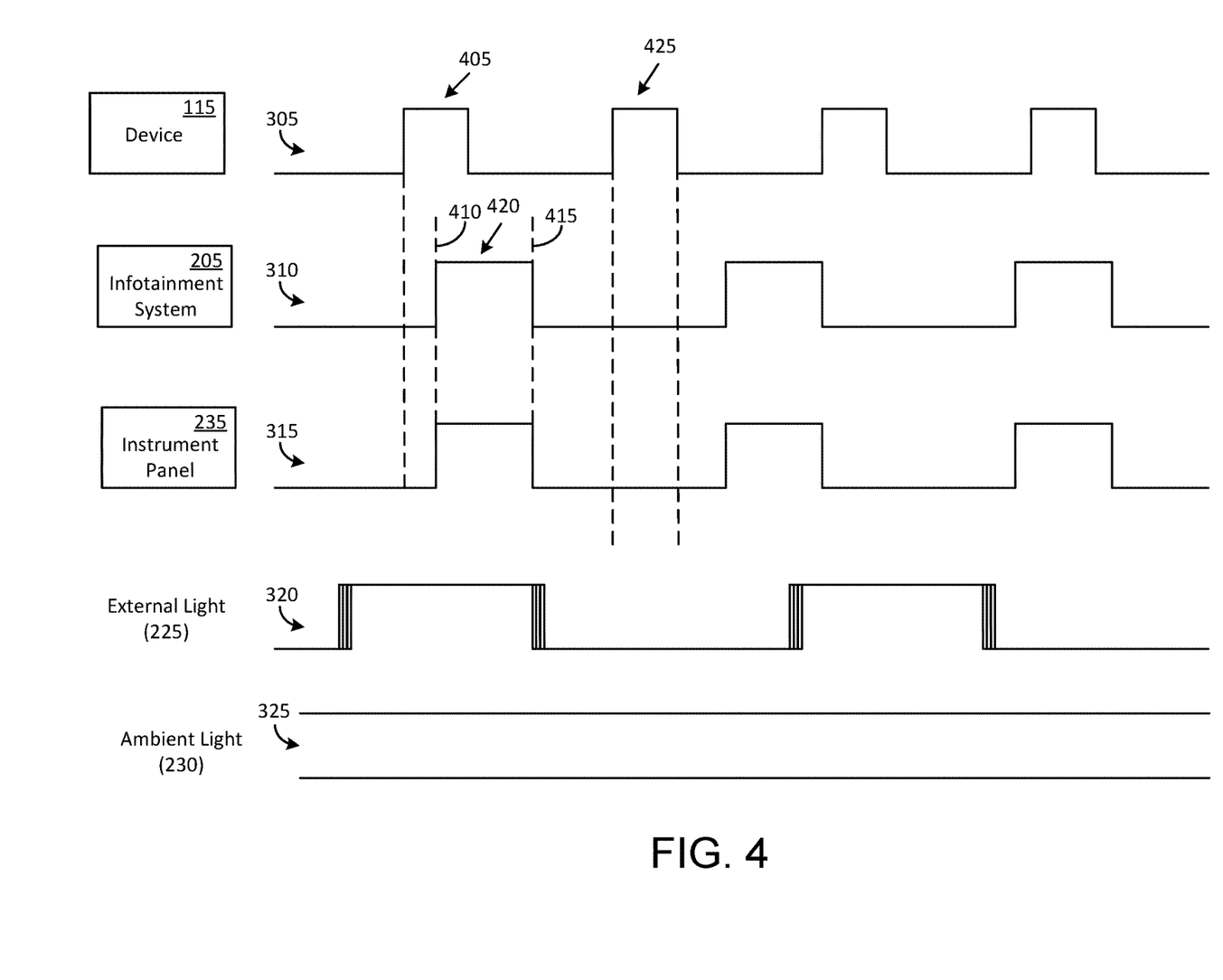
FIG. 4 illustrates some example pulse patterns that are arranged for detecting distracted driving in accordance with an embodiment of the disclosure.

FIG. 4 illustrates the example pulse patterns described above, arranged to detect a presence of the device 115 inside the vehicle 100 and outside a field of view of the driver monitoring camera 105. Some of the pulse patterns may be present in a first image data sample received by the ADAS 125 from the driver monitoring camera 105. The remaining pulse patterns may be present in a second data sample received by the ADAS 125 from the external object monitoring camera 120. The first image data sample and the second image data sample may be evaluated by the ADAS 125 in various ways in order to detect the presence of the device 115.

In an embodiment in accordance with the disclosure, the ADAS 125 executes a light source identification procedure that involves identifying and disregarding the ambient light condition 325. The ambient light condition 325 may be identified in various ways such as, for example, by detecting a substantially constant DC voltage offset in the first image data sample and/or the second image data sample. The amplitude of the DC voltage offset generally corresponds to an intensity of the ambient light condition 325 present in the cabin area of the vehicle 100. The DC voltage offset may be either removed or disregarded prior to identifying the remaining pulse patterns.

The pulse pattern 320 is primarily present in the second image data sample received by the ADAS 125 from the external object monitoring camera 120, which is arranged to specifically capture images of objects in front of the vehicle 100 (tail lights, headlights, traffic lights, lights on buildings, lights on fixtures, etc.). The pulse pattern 320 may either be removed or disregarded prior to identifying the remaining pulse patterns. Removing and/or disregarding pulse pattern 320 may be carried out by employing various types of image processing techniques in the time domain and/or in the frequency domain (digital filtering, frequency cancellation, etc.).

The remaining pulse patterns now include pulse pattern 305 (if the device 115 is in operation in the cabin area of the vehicle 100), pulse pattern 310, and pulse pattern 315. In an example implementation of the light source detection procedure, the pulse pattern 310 and pulse pattern 315 may be identified by executing one or more of a pulse alignment procedure, a pulse varying procedure, and/or a pulse turning off procedure. The pulse alignment procedure may be carried out by aligning the pulse pattern 310 with the pulse pattern 315. When aligned, a leading edge of each pulse in the pulse pattern 310 is aligned with a leading edge of each pulse in the pulse pattern 315 (as indicated by a dashed line 410). A falling edge of each pulse in the pulse pattern 310 is automatically aligned with a falling edge of each pulse in the pulse pattern 315 (as indicated by a dashed line 415) when the duty cycle of the pulse pattern 310 is identical to that of the pulse pattern 315. The alignment may be carried out by applying clock signals and/or control signals provided by the vehicle computer 130 (for example) to circuitry contained in the infotainment system 205 (pulse pattern 310) and the instrument panel 235 (pulse pattern 315). Alignment may also be carried out in the ADAS 125 by executing one or more software programs and software algorithms.

The alignment procedure may be followed by a windowing operation to identify a phase offset between the pulse pattern 305 and the pulse pattern 310 (or pulse pattern 315). The windowing operation, which may be executed by the ADAS 125 in the time domain, may identify a phase offset between a leading edge of a pulse 405 of the pulse pattern 305 and a leading edge of a pulse 420 of the pulse pattern 310. The phase offset provides an identification of the pulse pattern 305 with respect to the pulse pattern 310 and the pulse pattern 315 that are phase-aligned with each other. The pulse pattern 305 may also contain a pulse 425 that has no overlap with any pulse the pulse pattern 310 and/or the pulse pattern 315.

In another embodiment in accordance with the disclosure, the ADAS 125 executes a light source identification procedure that involves identifying and disregarding the ambient light condition 325 and the pulse pattern 320 after identification in the manner described above. The ADAS 125 may then cooperate with the vehicle computer 130 to perform an intentional phase shift in the pulse pattern 310 and/or the pulse pattern 315. The intentional phase shift may also be executed by software in the ADAS 125. The intentional phase shift, which may be performed with or without aligning the pulse pattern 310 with the pulse pattern 315, may then be detected by the ADAS 125 in order to identify the pulse pattern 310 and/or the pulse pattern 315. The pulse pattern 305 may be identified as the pulse pattern that did not undergo the intentional phase shift.

In yet another embodiment in accordance with the disclosure, the ADAS 125 executes a light source identification procedure that involves identifying and disregarding the ambient light condition 325 and the pulse pattern 320 after identification in the manner described above. The ADAS 125 may then cooperate with the vehicle computer 130 to perform an intentional turning off procedure whereby the infotainment system 205 and/or the instrument panel 235 is turned off momentarily. The pulse pattern 310 and/or the pulse pattern 315 corresponding to the turned off device will disappear, thereby leading to an identification of the infotainment system 205 and/or the instrument panel 235. The pulse pattern 305 may then be identified as the pulse pattern that was not affected by the turning off operation.

The various operations described above may be performed using various signal processing techniques and/or image processing techniques. A few examples of signal processing techniques may include separation of overlapping patterns, temporal domain processing (time windowing), frequency domain filtering (overlapping spectra), comparing two or more image data samples. A few examples of image processing may include the utilization of photometric stereo principles to determine locations of one or more light sources (device 115, infotainment system 205, the instrument panel 235, etc.), and aligning of signals obtained from individual rows of a CMOS sensor in the driver monitoring camera 105 and/or other cameras. Such actions may permit determining parameters such as frequency, repetition rate, phase, and duty cycle of various pulse patterns.

The ADAS 125 may also carry out other operations in order to detect the device 115, such as, for example, determining a head pose of the driver 110, the direction of gaze of the driver 110, and optimizing operational parameters of the driver monitoring camera 105 and/or other cameras (exposure, signal gain, focus, a field of view, etc.).

Figure 5:
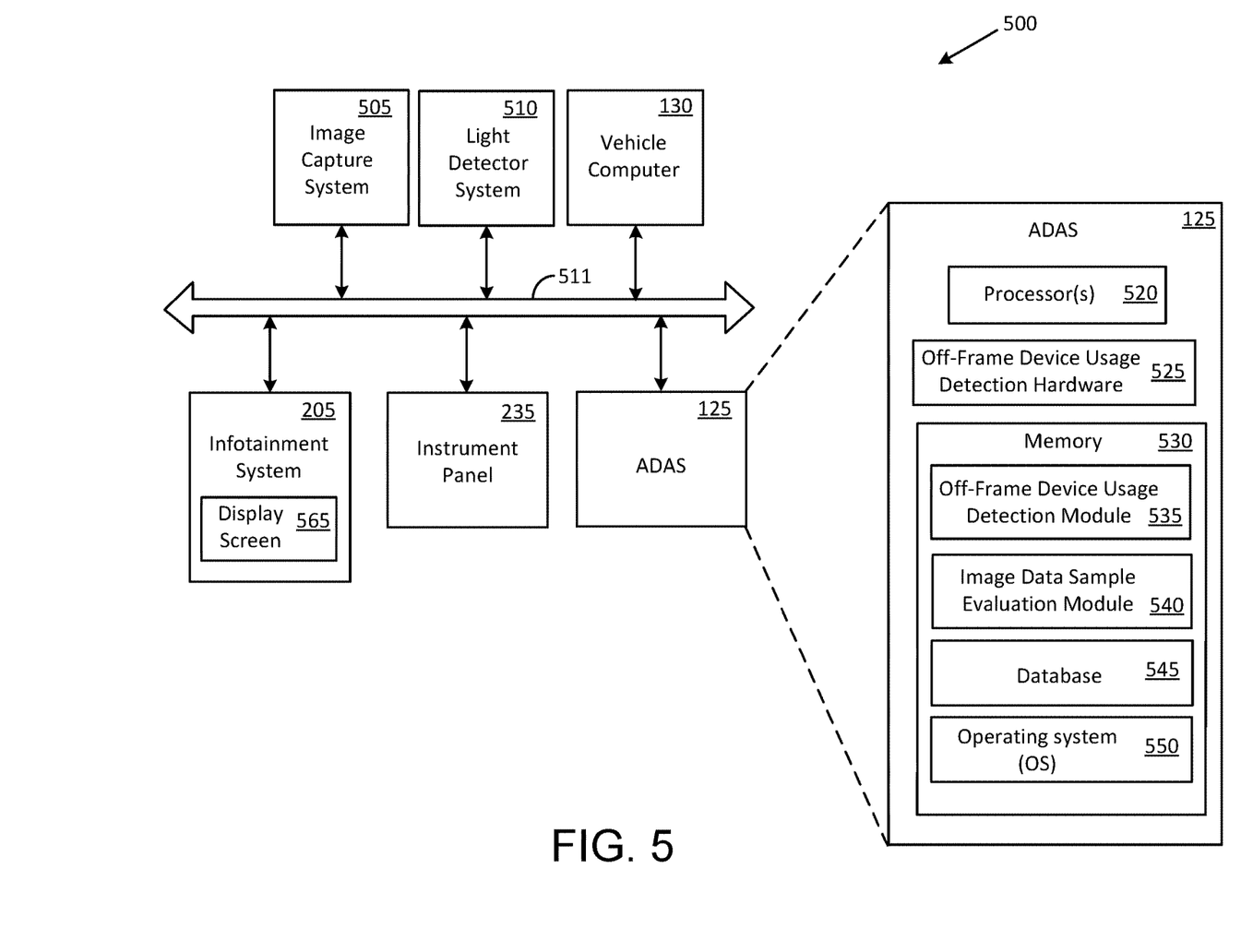
FIG. 5 shows some example components of an off-frame device usage detection system in accordance with an embodiment of the disclosure.

FIG. 5 shows some example components of an off-frame device usage detection system 500 in accordance with an embodiment of the disclosure. The off-frame device usage detection system 500 includes various components that are installed in the vehicle 100 such as the ADAS 125, the vehicle computer 130, the infotainment system 205, the instrument panel 235, an image capture system 505, and a light detector system 510. The various components are communicatively coupled to each other via one or more buses such as an example bus 511.

The bus 511 may be implemented using various wired and/or wireless technologies. For example, the bus 511 can be a vehicle bus that uses a controller area network (CAN) bus protocol, a Media Oriented Systems Transport (MOST) bus protocol, and/or a CAN flexible data (CAN-FD) bus protocol. Some or all portions of the bus 511 may also be implemented using wireless technologies such as Bluetooth®, Bluetooth®, Ultra-Wideband, Wi-Fi, Zigbee®, or near-field-communications (NFC). For example, the bus 511 may include a Wi-Fi communication link that allows the ADAS 125 to wirelessly communicate with the vehicle computer 130. The infotainment system 205 can include various elements such as, for example, a radio, a DVD player, an MP3 player, a video player, and a display screen 565. The display screen 565 may include light-emitting devices (such as LEDs, OLEDs, micro-LEDs, LCD, etc.) that operate in a pulsed modulation format and emit light having the pulse pattern 310 described above. The instrument panel 235 may also include a display screen containing light-emitting devices (such as LEDs) that operate in a pulsed modulation format and emit light having the pulse pattern 315 described above.

The image capture system 505 may include one or more cameras such as, for example, the driver monitoring camera 105 and the external object monitoring camera 120 that are described above. Some or all of the cameras of the image capture system may operate under the control of the ADAS 125, such as, for example, carry out image capture operations when image capture commands are received from the ADAS 125. The captured images of any one or more cameras can be propagated to the ADAS 125 in the form of image data samples via the bus 511. In some applications, the image data samples may be propagated to the ADAS 125 in real-time, such as, for example, in the form of a video stream. In some applications, various settings of a camera such as, for example, a zoom setting, a region of interest, exposure duration, frame to frame time gap, or a focus setting, may be set in response to commands issued by the ADAS 125.

The light detector system 510 may include light sensors that generate digital data samples in response to detecting various types of light across various parts of the spectrum (ranging from visible to invisible wavelengths). In some implementations in accordance with this disclosure, the light detector system 510 may complement some functions performed by the image capture system 505. For example, a light sensor may be mounted in the vehicle 100 so as to detect ambient light present in the cabin of the vehicle 100. The light sensor may convey a digital data sample of the ambient light to the ADAS 125 via the bus 511. The ADAS may use the digital data sample instead of, or to validate, an ambient light measurement performed upon a digital data sample received from the driver monitoring camera 105.

The ADAS 125 may include various components such as, for example, a processor 520, off-frame device usage detection hardware 525, and a memory 530. The memory 530, which is one example of a non-transitory computer-readable medium, may be used to store an operating system (OS) 550 and various code modules such as, for example, an off-frame device usage detection module 535 and an image data sample evaluation module 540. The code modules are provided in the form of computer-executable instructions that can be executed by the processor 520 for performing various operations in accordance with the disclosure. The memory 530 may also include a database 545.

The off-frame device usage detection hardware 525 can include various hardware components that perform various functions such as, for example, receive digital data samples from the image capture system 505 and/or the light detector system 510 and storing the digital data samples in the memory 530. Hardware components such as integrated circuits (ICs) and application specific integrated circuits (ASICs) may perform various hardware functions in cooperation with the execution of the off-frame device usage detection module 535 by the processor 520.

The off-frame device usage detection module 535 may be executed by the processor 520 in order to carry out various operations in accordance with the disclosure, such as, for example, detecting distracted driving by the driver 110 of the vehicle 100. The off-frame device usage detection module 535 may operate in cooperation with the image data sample evaluation module 540, which may be executed by the processor 520 to carry out functions such as those described above with respect to various pulse patterns.

The database 545 may store information that is useable by the off-frame device usage detection module 535 to perform operations in accordance with the disclosure. In an example implementation, the database 545 may store historical data about various devices, such as, for example, the pulse pattern 305 associated with the device 115. The pulse pattern 305 stored in the database 545 may be used as a reference template during the execution of the off-frame device usage detection module 535 to detect the usage of the device 115 inside the vehicle 100.

Figure 6:
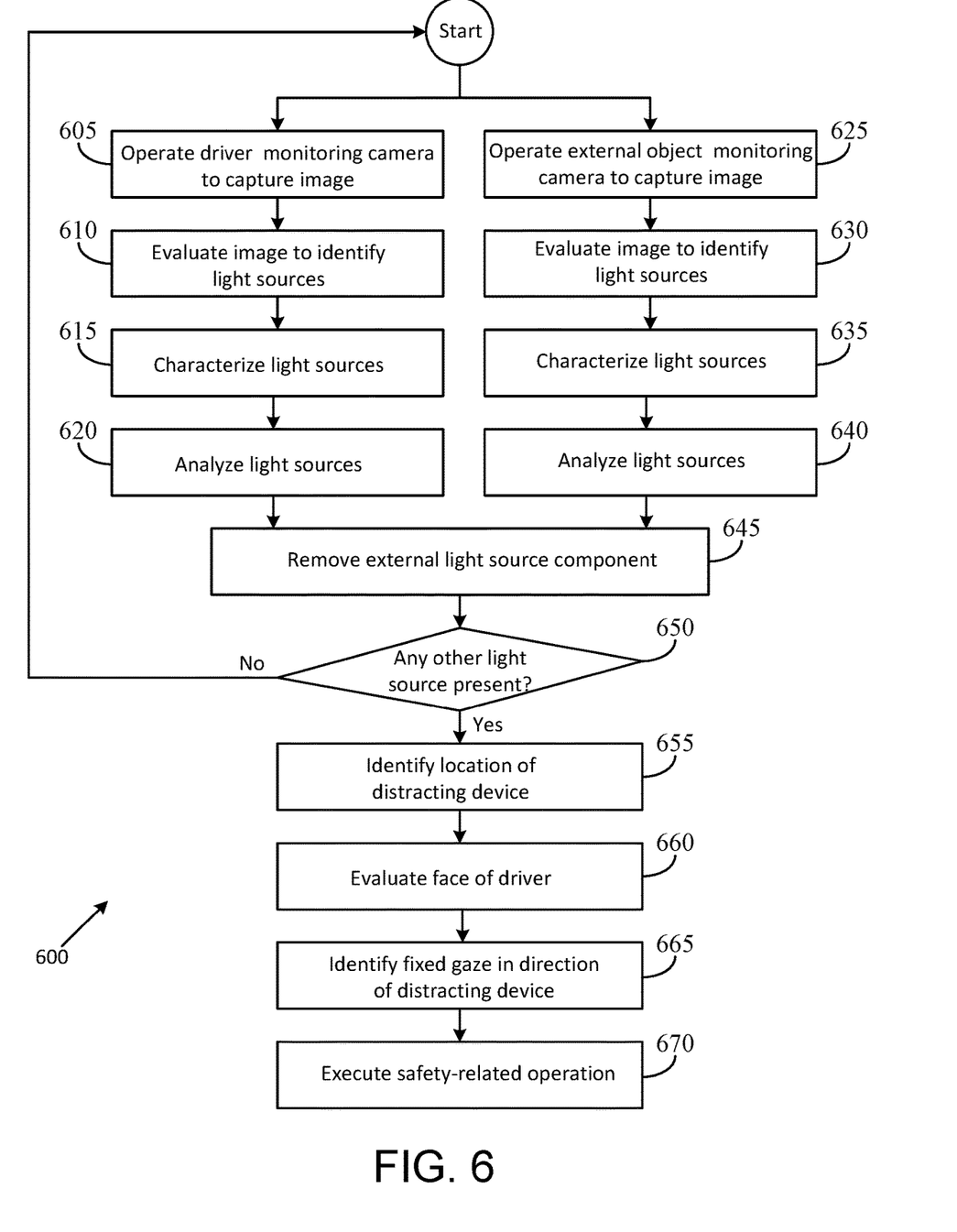
FIG. 6 shows a flowchart of an example method to detect distracted driving in accordance with an embodiment of the disclosure.

FIG. 6 shows a flowchart 600 of an example method to detect a device that is present inside a cabin of a vehicle and outside a field of view of a driver monitoring camera. The flowchart 600 illustrates an example sequence of operations that can be implemented in hardware, software, or a combination thereof. In the context of software, the operations represent computer-executable instructions stored on one or more non-transitory computer-readable media such as the memory 530, which, when executed by one or more processors such as the processor 520, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The operations indicated in the flowchart 600 have been described by referring to the vehicle 100 and the example components described above. However, it must be understood that the flowchart 600 is equally applicable to various other vehicles and various other components in accordance with the disclosure. Some or all of the operations described in the flowchart 600 may be executed by the ADAS 125. It must be understood, however, that various actions executed by the ADAS 125 can be equally applicable to various other components such as, for example, a cloud-based computer and/or the vehicle computer 130.

At block 605, the driver monitoring camera 105 is operated for capturing one or more images of the driver 110 of the vehicle 100 and more particularly, the face of the driver 110. The image(s) may provide information related to light that is emitted by one or more light sources and incident upon the face of the driver 110. One of the light sources can include a display screen of the device 115 when placed outside a field of view of the driver monitoring camera 105. In an example scenario, the driver 110 may have placed the device 115 upon the dashboard of the vehicle 100 where he/she can watch the display screen of the device 115 while glancing occasionally at the road ahead and/or to fool the ADAS 125 into concluding that he/she is watching the road ahead. In another example scenario, the driver 110 may be a careful driver who pays attention to the road ahead and avoids getting distracted by the use of gadgets such as the device 115 when driving the vehicle 100.

At block 610, the ADAS 125 may receive one or more image data samples from the driver monitoring camera 105. The ADAS 125 evaluates the image data sample(s) to detect a presence of various types of light that may be incident upon the face of the driver 110. The various types of light may be emitted by various light sources such as, for example, the light sources described above (device 115, infotainment system 205, instrument panel 235, etc.).

At block 615, the ADAS 125 may characterize the various types of light that may be incident upon the face of the driver 110. In an example embodiment, the characterization may be carried out in the form of determining one or more pulse patterns that may be present in the image data sample(s). A few example pulse patterns are described above and illustrated in FIG. 3 and FIG. 4. In another example embodiment, the characterization may be carried out in the form of determining various wavelengths of spectral content of the light that may be incident upon the face of the driver 110.

At block 620, the ADAS 125 may analyze the characterized parameters (pulse patterns and/or spectral content). The pulse patterns may be analyzed and evaluated in various ways including in the manner described above with reference to FIG. 4. Spectral content may also be analyzed and evaluated in various ways. In an example implementation, the ADAS 125 may obtain information about a spectral content of light emitted by one or more devices. The information may be obtained from various sources such as, for example, from a cloud-based storage element or may be stored in the database 545 of the ADAS 125.

More particularly, the spectral content of light emitted by the instrument panel 235 may contain wavelengths emitted by green LEDs and/or blue LEDs (for example) that are provided in the instrument panel 235 for displaying information such as speed, mileage, the battery state of charge, the gasoline level, etc. These light-emitting components would not emit light of certain wavelengths, such as, for example, yellow or green. Another device that is present in the cabin of the vehicle 100 may have a monochrome display screen that emits light of a single wavelength (or a narrow band of wavelengths). Ambient light produced by sunlight has a spectral content that spans visible as well as invisible wavelengths (ultraviolet, infrared, etc.). The device 115 (which can be a smartphone, for example) may be operated by the driver 110 to watch a video while driving. The video would typically contain spectral content encompassing a range of visible wavelengths. The ADAS 125 may utilize such spectral content information of these various light sources in order to distinguish and identify the device 115 (when the device 115 is operated in the vehicle 100).

At block 625, the external object monitoring camera 120 is operated for capturing one or more images of objects located in front of the vehicle 100. Some of these objects may include sources of light (tail light of another vehicle, head light of another vehicle, etc.).

At block 630, the ADAS 125 may receive one or more image data samples from the external object monitoring camera 120. The ADAS 125 evaluates the image data sample(s) to detect a presence of various types of light that may be incident upon the face of the driver 110. The various types of light may be emitted by various light sources such as, for example, a brake light of a vehicle ahead of the vehicle 100, a head light of an oncoming vehicle, a traffic sign, and/or a neon sign on a building.

At block 635, the ADAS 125 may characterize the various types of light in the image data sample(s) received from the external object monitoring camera 120. In an example embodiment, the characterization may be carried out in the form of determining one or more pulse patterns that may be present in the image data sample(s) such as, for example, the pulse pattern 320 illustrated in FIG. 3 and FIG. 4. In another example embodiment, the characterization may be carried out in the form of determining various wavelengths of spectral content of the light incident upon the face of the driver 110.

At block 640, the ADAS 125 may analyze the characterized parameters (pulse patterns and/or spectral content). The pulse patterns may be analyzed and evaluated in various ways including in the manner described above with reference to FIG. 4. Spectral content may also be analyzed and evaluated in various ways. In an example implementation, the ADAS 125 may obtain information about a spectral content of light emitted by one or more elements in the objects ahead of the vehicle 100. The information may be obtained from various sources such as, for example, from a cloud-based storage element or may be stored in the database 545 of the ADAS 125. More particularly, the spectral content of light emitted by a brake light, for example, may be predominantly a red wavelength. The spectral content of a hazard light in another vehicle may be predominantly an orange wavelength. The ADAS 125 may utilize such spectral content information of various light sources in order to identify light emitted by objects ahead of the vehicle 100.

At block 645, the ADAS 125 removes the external light content identified at block 640 from the light content identified at block 620, which includes light content emitted by the device 115 (if present).

At block 650 a determination is made whether any light content is remaining after the action taken at block 650. If such light content does not exist (because device 115 is not being operated), the action returns to the start of the flowchart 600.

If such light content exists, at block 655, the ADAS 125 determines a location of the device 115 which is the originator of this light content. The location of the device 115 may be determined in various ways such as, for example, by evaluating shadows and lighting angles of light incident upon the face of the driver 110.

At block 660, the ADAS 125 may evaluate the image data sample to make a determination that the driver 110 is looking towards the location of the device 115.

At block 665, the ADAS 125 may make a determination whether the driver 110 is fixedly staring towards the location of the device 115. In some cases, the driver 110 may turn away from the device 115 sometimes to look towards the road ahead. Such behavior may not necessarily constitute distracted driving as long as the duration of the gaze of the driver 110 towards the device 115 is below a threshold time parameter. The threshold time parameter may be set by the ADAS 125 and used for driver gaze evaluation. Additional actions may be also taken such as, for example, determining a size of the display screen of the device 115 and whether the size of the display screen hampers a view of the road ahead.

If the driver retains a fixed gaze towards the device 115 that exceeds the thresholds time parameter, at block 670, the ADAS 125 may execute one or more safety-related operations. In an example scenario, the ADAS 125 may issue audible and/or haptic alerts. In another example scenario, the ADAS 125 may take over some driving operations of the vehicle 100 (braking, acceleration, cruise control, etc.) and/or prevent engagement or disengagement of a feature of the ADAS 125.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 520, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 530, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
executing a light source identification procedure to detect a first device that is present inside a cabin of a vehicle and outside a field of view of a driver monitoring camera, the light source identification procedure comprising:
identifying a first pulse pattern of light emitted by a first display screen of the first device;
identifying a second pulse pattern of light emitted by a second display screen of a second device; and
detecting the first device by executing a time windowing operation to evaluate a phase relationship between the first pulse pattern of light and the second pulse pattern of light; and
executing a safety-related operation in response to detecting the first device inside the cabin of the vehicle.

2. The method of claim 1, wherein the second device is a component of the vehicle and the first device is a personal communication device that has been placed outside the field of view of the driver monitoring camera.

3. The method of claim 1, wherein executing the safety-related operation comprises alerting a driver of the vehicle or disengaging a feature of an advanced driver-assistance system of the vehicle.

4. The method of claim 1, wherein the light source identification procedure further comprises:
identifying a third pulse pattern of light emitted by a third display screen of a third device; and
detecting the first device by evaluating the first pulse pattern of light with respect to the second pulse pattern of light or the third pulse pattern of light.

5. The method of claim 4, wherein evaluating the first pulse pattern of light with respect to the second pulse pattern of light or the third pulse pattern of light comprises:
executing the time windowing operation upon a first pulse having the first pulse pattern of light, a second pulse having the second pulse pattern of light, and a third pulse having the third pulse pattern of light.

6. The method of claim 5, further comprising:
executing an aligning operation to align the second pulse having the second pulse pattern of light with the third pulse having the third pulse pattern of light prior to the time windowing operation.

7. A method comprising:
obtaining a first image data sample from a driver monitoring camera of a vehicle, the first image data sample containing information of light incident upon a face of a driver of the vehicle;
evaluating the first image data sample to identify one or more devices that emit the light that is incident upon the face of the driver;
identifying the one or more devices and detecting a first device among the one or more devices that is present inside the vehicle and outside a field of view of the driver monitoring camera, wherein the detecting of the first device comprises:
identifying a first pulse pattern of light emitted by a first display screen of the first device;
identifying a second pulse pattern of light emitted by a second display screen of a second device among the one or more devices; and
detecting the first device by executing a time windowing operation to evaluate a phase relationship between the first pulse pattern of light and the second pulse pattern of light; and
executing a safety-related operation in response to detecting the first device inside the cabin of the vehicle.

8. The method of claim 7, wherein detecting the first device further comprises:
determining a first spectral characteristic of light emitted by the first device; and
detecting the first device by evaluating the first image data sample to detect a presence of the first spectral characteristic of light in the first image data sample.

9. The method of claim 7, wherein detecting the first device further comprises:
identifying that the first pulse pattern of light is incident upon the face of the driver;
identifying that the second pulse pattern of light is incident upon the face of the driver;
turning off the second device;
detecting, after turning off the second device, a presence of the first pulse pattern of light that is incident upon the face of the driver; and
determining that the first pulse pattern of light is emitted by the first display screen of the first device.

10. The method of claim 7, wherein detecting the first device further comprises:
obtaining a second image data sample from an external object monitoring camera of the vehicle, the second image data sample comprising information of light that enters the vehicle from outside the vehicle;
identifying the first pulse pattern of light based on evaluating the first image data sample obtained from the driver monitoring camera;
identifying the second pulse pattern of light based on evaluating the first image data sample obtained from the driver monitoring camera;
identifying a third pulse pattern of light based on evaluating the second image data sample obtained from the external object monitoring camera; and
detecting the first device by evaluating the first pulse pattern of light, the second pulse pattern of light, and the third pulse pattern of light.

11. The method of claim 10, wherein detecting the first device by evaluating the first pulse pattern of light, the second pulse pattern of light, and the third pulse pattern of light comprises:
disregarding the third pulse pattern of light;
executing the time windowing operation to evaluate the phase relationship between the first pulse pattern of light and the second pulse pattern of light; and
detecting the first device based on the phase relationship between the first pulse pattern of light and the second pulse pattern of light.

12. The method of claim 11, wherein the time windowing operation comprises:
determining a first duty cycle of the second pulse pattern of light; and
selecting a repetitive time window having a second duty cycle that matches the first duty cycle of the second pulse pattern of light.

13. A vehicle comprising:
a driver monitoring camera that produces a first image data sample containing information of light incident upon a face of a driver of the vehicle; and
a driving assistance system comprising:
a memory that stores computer-executable instructions; and a processor configured to access the memory and execute the computer-executable instructions to:

execute a device detection procedure upon the first image data sample to detect a first device that is present inside a cabin of the vehicle and outside a field of view of the driver monitoring camera; and execute a safety-related operation in response to detecting the first device inside the cabin of the vehicle, wherein the detecting of the first device comprises:

identifying a first pulse pattern of light emitted by a first display screen of the first device;

identifying a second pulse pattern of light emitted by a second display screen of a second device; and detecting the first device by executing a time windowing operation to evaluate a phase relationship between the first pulse pattern of light and the second pulse pattern of light.

14. The vehicle of claim 13, wherein the driver monitoring camera is a rolling shutter camera that produces the first image data sample.

15. The vehicle of claim 14, wherein the rolling shutter camera comprises a complementary metal oxide semiconductor (CMOS) sensor.

16. The vehicle of claim 13, wherein the first device that is present inside the cabin of the vehicle is a personal communication device placed upon a dashboard of the vehicle.

17. The vehicle of claim 13, further comprising:

an external object monitoring camera that produces a second image data sample comprising information of light that enters the vehicle from outside the vehicle.

18. The vehicle of claim 17, wherein the light that enters the vehicle from outside the vehicle is ambient light present outside the vehicle or light emitted by a light-emitting component of another vehicle.

* * * * *